H. CSANYI.
ELECTRIC BATTERY.
APPLICATION FILED NOV. 3, 1913.
1,130,710. Patented Mar. 9, 1915.
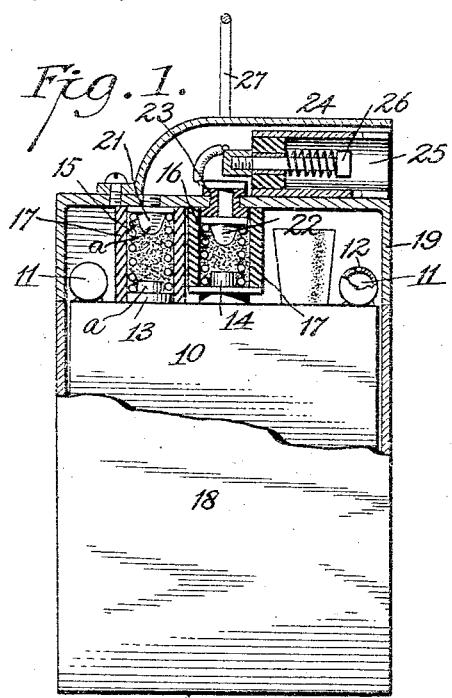
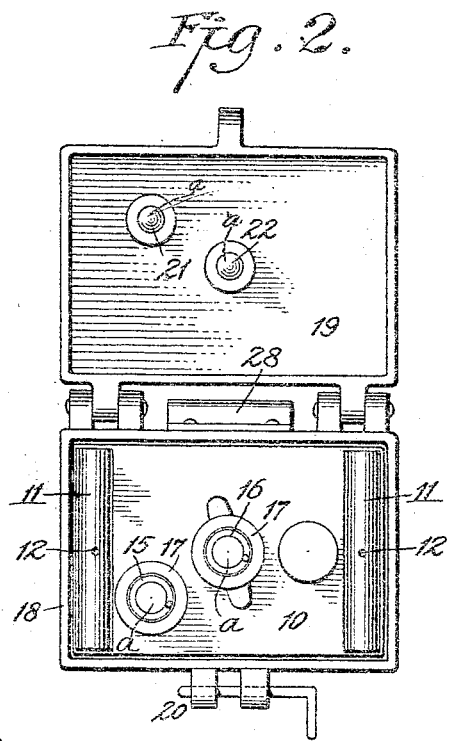
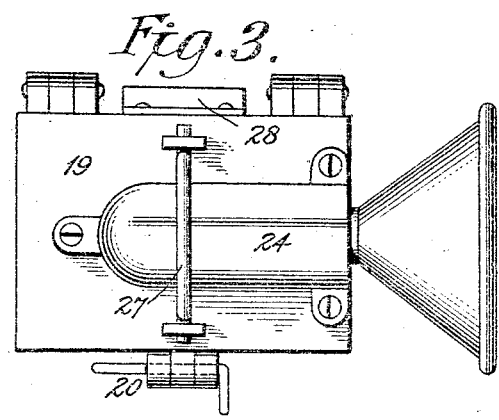
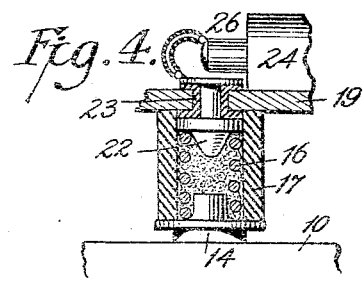
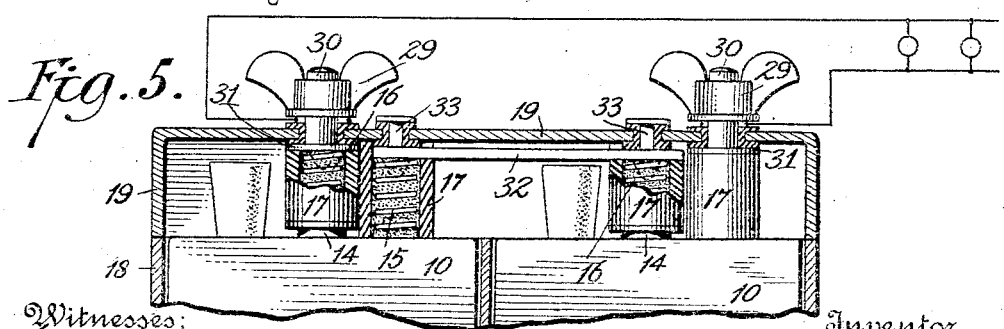
Witnesses: Inventor
Henry Csanyi.
By his Attorneys
Meyers, Cushman & Rea

UNITED STATES PATENT OFFICE.

HENRY CSANYI, OF NEW YORK, N. Y., ASSIGNOR TO MAXIVOLT PRIMARY BATTERY CO., OF NEW YORK, N. Y., A CORPORATION OF NEW JERSEY.

ELECTRIC BATTERY.

1,130,710.

Specification of Letters Patent.

Patented Mar. 9, 1915.

Application filed November 3, 1913. Serial No. 798,937.

*To all whom it may concern:*

Be it known that I, HENRY CSANYI, a subject of the King of Hungary, residing at New York, in the county of New York and State of New York, have invented new and useful Improvements in Electric Batteries, of which the following is a specification.

This invention relates to electric batteries, particularly to such as are inclosed for protection and otherwise in more or less tight casings into which casings the gases generated by decomposition of the battery elements escape and attack the contacts of the line wires corroding them to such an extent as to very seriously impair the flow of the current.

The object of the invention is to overcome this defect by providing the incased battery cells with means for maintaining at all times clean contacts, in an electrical sense, by surrounding them with non-corrodible material, which renders them inert to the action of the gases. To this end, the battery cells, which may be sealed cells with vent holes for gases, or open cells as preferred, or as necessity demands, are, in one form of the invention placed each in a closely fitting case made of metal or other suitable material furnished with a hinged cover upon which are mounted two terminals through which the battery current passes to the line. The inner ends of these terminals project into the cover to enter the hollow resilient terminals of the battery cell when the cover is closed, and are protected from the corroding action of escaping gases by surrounding each terminal with an elastic or yielding jacket that extends from the top of the cell to the inner face of the cover when the latter is closed, and further, these jackets are filled with a fluid or semi-fluid substance that covers the terminals and is non-corrodible and non-corrosive.

If desired a lamp socket may be attached to the casing, preferably to the cover and connected to the terminals thereon, furthermore a carrying handle and a loop for a body belt may also be mounted on the casing.

When a number of cells are contained within one casing and the current to be used at a distance, two of the cover terminals are fitted with binding screws for the line wires, and the others coupled together in pairs to complete the circuit through all the batteries when the cover is closed.

In the accompanying drawings: Figure 1 is an elevation of a single battery cell inclosed in a casing with the upper part broken away to show the separable terminals in contact. Fig. 2 is a top plan view of an incased battery cell with the hinged closure opened. Fig. 3 is a similar view with the cover closed showing an incandescent lamp socket secured thereon and a lamp supported in the socket. Fig. 4 is a detail sectional view of one of the terminal connections. Fig. 5 is a sectional view showing how two or more cells contained in a single casing may be coupled up and their terminals protected from corrosion.

In the drawings 10 indicates a battery cell, in the present instance shown sealed with vent channels 11 on its top having vent openings 12 through which the gases generated by the decomposition of the elements escape into the atmosphere. Projecting through the top of the cell 10 are the contacts or upper ends of the elements 13, 14, having attached thereon terminals 15, 16 herein shown in each instance as made of a helical coil of wire. These terminals project a short distance above the battery and are each surrounded by a jacket 17 made of some yielding material, such as rubber. These jackets closely embrace the terminals and form shields therefor to protect them against the gases flowing out through the vents 12.

For the purpose of carrying the battery about it is mounted within a casing 18 provided with a cover 19 which may be hinged, as shown, if desired. A fastening 20 of any type may be employed to lock the cover in closed position. Projecting through the top of the cover 19 in position to enter and engage the terminals 15, 16, are two terminal points 21, 22, the latter point being insulated from the cover as shown at 23. The terminal 21 is fastened directly to the cover, which in the present instance is made of metal and forms a part of the circuit. The terminals 21 and 22 and the contacts 13 and 14 preferably have button-like projections *a* received in the ends of the coils to retain the coils.

Fastened on the top of the cover 19 is a shield 24 covering the terminals and open at one end. Within the shield is affixed a lamp socket 25, the outer shell of which is in contact with the cover 19 of the casing and forms one of the contacts for an electric lamp which may be inserted in the socket. A second contact 26 insulated from the socket is connected by a wire with the insulated terminal 23, said contact 26 being yieldingly mounted in the socket to permit a slight depression thereof when the lamp is inserted, and thus insure a perfect contact.

The contacts 21 and 22 attached to the cover 19 have their ends, which project into the terminals 15, and 16, made tapering and of such diameter that their peripheries will rub against the contacts 15 and 16 as they enter and leave them, and thus keep these parts bright and also clean to insure good electrical connection between them. If desired the jackets 17 may be filled with a fluid or semi-fluid substance, such as vaseline, which is both non-corrosive and non-corrodible, that covers all parts of the contacts, and further protects them from the destructive influences of the gases. Vaseline, the substance preferred, has no affinity for the metal of the terminal, and, therefore, is very readily scraped off the surface of the terminals 15, 16 by the entrance of the terminals 21, 22, thereinto sufficiently to secure good electrical contacts. The jackets 17 project a short distance above the terminals and sufficiently high to engage the underside of the cover 19 when the latter is closed, and be compressed by said cover, thus insuring a tight joint between the ends of the jackets and the cover, as also between the jackets and the top of the battery.

For the purpose of transporting the battery a handle is hinged to the cover 19 while a loop 28 riveted on the casing 18 enables a body belt to be extended therethrough for the purpose of carrying the battery around the waist when desired.

On account of the viscous nature of a substance such as vaseline it will be seen that there is no danger of this substance leaking out of its jacket, and hence it is immaterial whether a tight joint be formed in the jacket below the level of the vaseline.

On occasions when two or more batteries are to be carried in a single casing the terminals 21, 22 will be so disposed that one of them will overlie a terminal of one battery and the other a different terminal of another battery, as shown in Fig. 5, and have on their outer ends thumb nuts 29 that are threaded on stems 30 connected to said terminals. These stems pass through the cover 19 and are insulated therefrom and have broad disks 31 on their inner ends, from which project tapering lugs similar to those on the terminals 21, 22, Fig. 1, that enter and engage the terminals 15 and 16 of the batteries. The other battery terminals are connected when the cover is closed in pairs by metal bars 32 fastened to the cover 19 by insulated pins 33. As constructed when the cover is closed the stems 30 contact with two of the battery terminals and each bar 32 with other contacts one on each battery in such manner as to connect up all the cells in series. On the underside of the bars 32 at their ends are tapered projections to enter and engage the helical terminals of the batteries.

What I claim is:—

1. An electric battery having a contact for an element thereof, a line terminal on a circuit line, a wire conductor adapted to yieldingly engage the said battery terminal and the said line terminal, and a non-corrodible jacket enveloping said terminals and said conductor.

2. An electric battery having a terminal for an element thereof, a line terminal on a circuit line, a wire conductor adapted to yieldingly engage the said battery terminal and the said line terminal, a non-corrodible jacket enveloping said terminals and said conductor, and a cover carrying the line terminal and closing the upper end of said jacket.

3. An electric battery having resilient terminals made of a helical coil of wire, each inclosed in a yielding non-corrodible jacket open at its outer end, and terminals on a circuit line adapted to engage said battery terminals and be sealed by jackets.

4. An electric battery inclosed in a case with a removable cover, line terminals mounted on said cover and projecting from the inner side thereof, terminals on the battery in position to be engaged by the line terminals when the cover is closed, and a jacket of yielding non-corrodible material attached to each battery terminal for inclosing each connected pair of terminals.

5. An electric battery inclosed in a case with a removable cover, line terminals mounted on said cover and projecting from the inner side thereof, combined with resilient terminals on the battery cell made of helical coils of wire adapted to be engaged by the line terminals when the cover is closed, and a jacket of yielding non-corrodible material attached to each battery terminal for inclosing each connected pair of terminals.

6. An electric battery having projecting spring terminals made of helical coils of wire, and a yielding jacket of non-corrodible material surrounding each terminal, in combination with an inclosing casing for the battery provided with a removable cover, and line terminals on said cover in position to engage the battery terminals within said jackets when said cover is closed.

7. An electric battery having hollow spring terminals made of helical coils of wire, an inclosing casing for said battery provided with a removable cover, line terminals on said cover in position to enter and engage said battery terminals when said cover is closed, and a non-corrodible jacket surrounding and wholly covering each battery terminal and extending from said battery to the inner surface of the cover.

8. An electric battery having opposed terminals, a yielding conducting member interposed between and contacting at its opposite ends with said terminals, a compressible jacket surrounding the conducting member and a viscous non-fluid substance in which said conducting member is embedded, said substance being non-corrosive and non-corrodible.

9. An electric battery having a contact for an element thereof, a wire conductor adapted to yieldingly engage the said battery contact, a non-corrodible jacket in the form of a tubular sleeve enveloping said battery contact and said conductor, a viscous substance within said jacket embedding said terminal and said conductor, means for inclosing the upper end of said jacket, and a contact adjacent thereto and engaging said conductor.

In testimony whereof I have hereunto set my hand in presence of two subscribing witnesses.

HENRY CSANYI.

Witnesses:
SIDNEY P. HOLLINGSWORTH,
E. H. BICKERTON.